United States Patent [19]
van Mil

[11] Patent Number: 4,567,624
[45] Date of Patent: Feb. 4, 1986

[54] DEVICE FOR REMOVING PIECES OF MEAT FROM BREAST OF SLAUGHTERED POULTRY

[75] Inventor: Martinus P. G. van Mil, Boxmeer, Netherlands

[73] Assignee: Stork PMT B.V., Boxmeer, Netherlands

[21] Appl. No.: 583,714

[22] Filed: Feb. 27, 1984

[30] Foreign Application Priority Data

Mar. 11, 1983 [NL] Netherlands ................... 8300907

[51] Int. Cl.⁴ ............................................. A22C 21/00
[52] U.S. Cl. ........................................ 17/11; 17/1 G; 17/46
[58] Field of Search ................. 17/11 B, 11 D, 1 G, 17/46

[56] References Cited

U.S. PATENT DOCUMENTS

| | | |
|---|---|---|
| 3,348,261 | 10/1967 | Segur ................... 17/1 G |
| 3,890,674 | 6/1975 | Fradin ................... 17/1 G |
| 3,946,461 | 3/1976 | Martin ................... 17/11 B |
| 3,947,920 | 4/1976 | Voornas ................... 17/1 G |
| 3,965,535 | 6/1976 | Kaplan ................... 17/1 G |
| 3,992,734 | 11/1976 | Chiron ................... 17/1 G |
| 4,041,572 | 8/1977 | Martin et al. ................... 17/46 |
| 4,184,229 | 1/1980 | Soran ................... 17/11 B |
| 4,385,421 | 5/1983 | Martin ................... 17/11 B |

Primary Examiner—Jimmy C. Peters
Attorney, Agent, or Firm—Newton, Hopkins & Ormsby

[57] ABSTRACT

Device for removing the pieces of meat from the breast of slaughtered poultry, with a plurality of flat carriers movable in a central longitudinal plane, each with clamping means, guide means above two cutting elements for making a cut on either side of the breastbone, two first scrapers for loosening the outermost fillet portions from the ribs and breastbone, two smaller second scrapers for loosening the frontmost fillet portions and two scrapers closely adjoining the two carrier surfaces.

14 Claims, 12 Drawing Figures

DEVICE FOR REMOVING PIECES OF MEAT FROM BREAST OF SLAUGHTERED POULTRY

This invention relates to a device for removing the pieces of meat from the breast of slaughtered poultry.

Although there exist several devices by means of which the meat can be removed from the bones of slaughtered poultry—vide e.g. the U.S. Pat. No. 4,041,572—there does not exist a device by means of which with a minimum of loss fillet parts can be removed from the breast and ribs of slaughtered poultry. As the breast of a bird is the tastiest and most expensive meat it is of importance that removing the fillets is done with a minimum of loss of this meat; in practice this operation is effected by hand which is a time consuming and costly procedure.

The invention aims to provide a device by means of which said operation can be effected mechanically. Such a device comprises according to the invention a plurality of flat carriers movable in a central longitudinal plane, each with a carrying edge and clamping means for the breast and, in succession, in the direction of movement of the carriers, guide means located above said carriers, two cutting elements one located on each side of the central longitudinal plane for making a cut on each side of the breastbone, two first scrapers located on each side of the said plane and diverging in the direction of movement of the carriers, for loosening the outermost fillet portions from the ribs and breastbone, two smaller second scrapers one located on each side of the said plane and diverging at a smaller angle relative to the said plane, for loosening the frontmost fillet portions and two scrapers which closely adjoin the two carrier surfaces and are at an angle to the direction of movement of the carriers, for the complete loosening of the two fillet halves from the breastbone.

During the movement of the carriers the breast first arrives at the cutting elements which make an incision at both sides of the breastbone; thereafter the first scrapers remove the outermost fillet portions from ribs and breastbone and the second scrapers remove the frontmost fillet portions. Finally the third scrapers remove the fillet parts from the carrier.

The whole operation is effected very efficiently without loss of meat; the fillets, thus obtained, contain no bone rests.

In a preferred embodiment each carrier carries a stop pin projecting from the carrier surface, for the front of the breast, while the second scrapers are located movable away from the carriers against a spring action and are coupled to a projecting stud pointing towards the first scrapers and co-operating with the stop pins of the carriers which can respectively be moved along underneath.

This stop pin gives the possibility to position the birds at the exact position on the carriers; when the upper edge thereof moves under the stud the second scrapers are pressed upwardly so that the breastbone can move freely thereunder.

Preferably the inlet guide is formed by a rotating driven positioning roll in combination with two guide strips located on each side of the cutting knife and diverging in the direction of movement of the carriers.

Preferably the cutting elements are formed by rotating driven knives and the clamping means are formed by a pair of grippers on the front edge of the carrier, which are movable crosswise relative to the middle longitudinal plane and are located on each side of the stop pin.

Preferably two grippers can rotate about a common hinge pin, each gripper being provided with a guide slot, running from the middle to the outer edge, which co-operates with a control pin which projects from a control rod which is located on the carrier and points towards the carrier edge.

In a preferred embodiment the outward pointing end of the control roll carries the stop.

To make the device suitable for processing so-called closed breast portions—in which both fillets are still interconnected by a part of the breast—the carrier can be provided with a recess which is at an acute angle to the carrier front edge and terminates near the grippers. Also the two carrier side walls near the clamping grippers can be provided with a recessed part.

The third scrapers are preferably formed by rotating driven scraper rolls provided with circumferential toothing.

The respective carriers can be coupled to one another and conjointly driven, guided in a frame which is provided with guidetracks for the control rod ends. Preferably the carriers are located in a circumferential configuration around a common axle of rotation.

Furthermore each scraper roll preferably carries at its upper end a toothwheel consisting of a cylindrical part and a conical part.

SURVEY OF THE DRAWINGS

FIGS. 3a and 3b make clear the positioning of a breast on a carrier;

Figure 1:
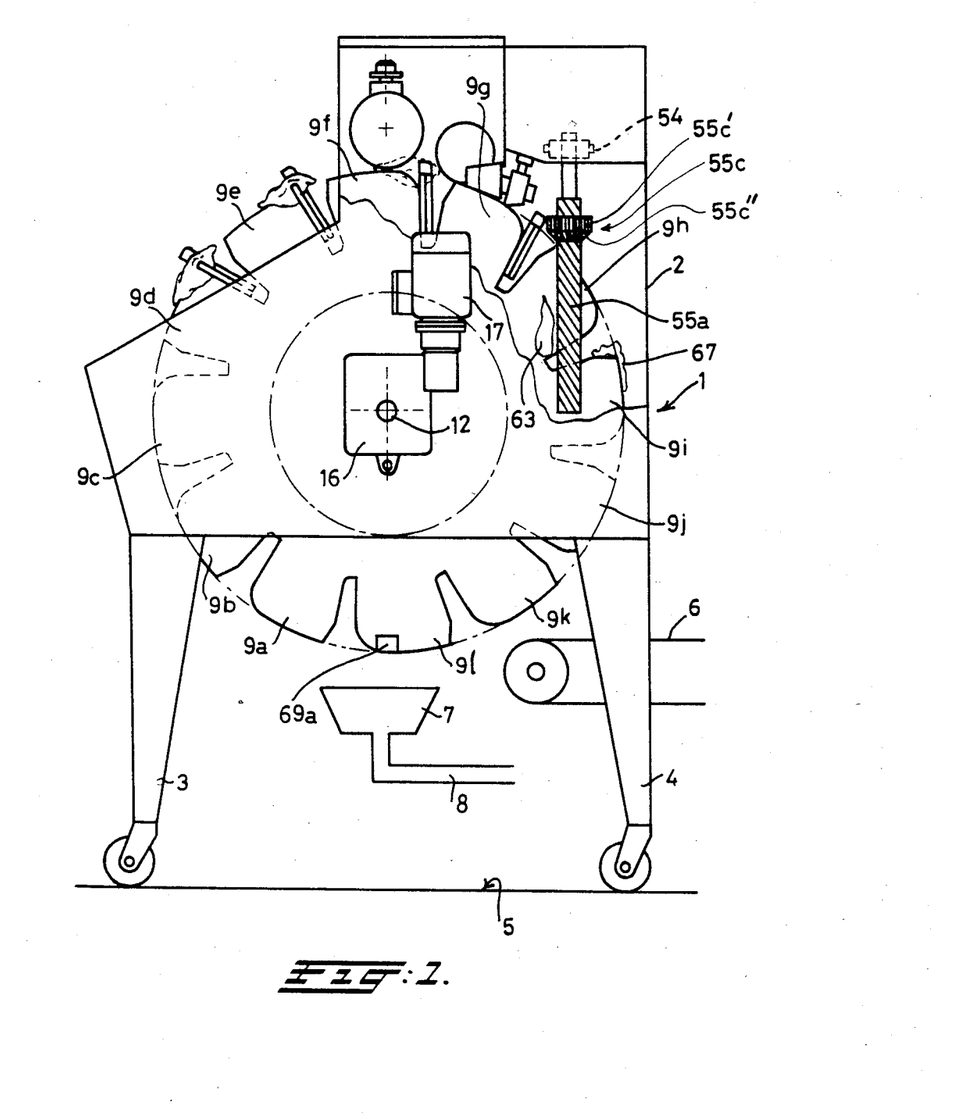
FIG. 1 is a side view of a complete device according to the invention.

In FIG. 1, the complete device is indicated by the reference numeral 1; the device consists of a frame 2 which rests on the floor 5 via the legs 3, 4. It should be noted that only one side of the device is illustrated because the far side is a mirror image of the side illustrated in FIG. 1. Under the frame there is attached a conveyor belt 6 for removing the chicken fillets produced by means of the device; the breastbone portions and rib remnants which remain after the treatment of the fillets are caught in the collecting trough 7 and are removed via the line 8 by vacuum suction. Of course, a conveyor belt can be employed in this position also.

Figure 5:
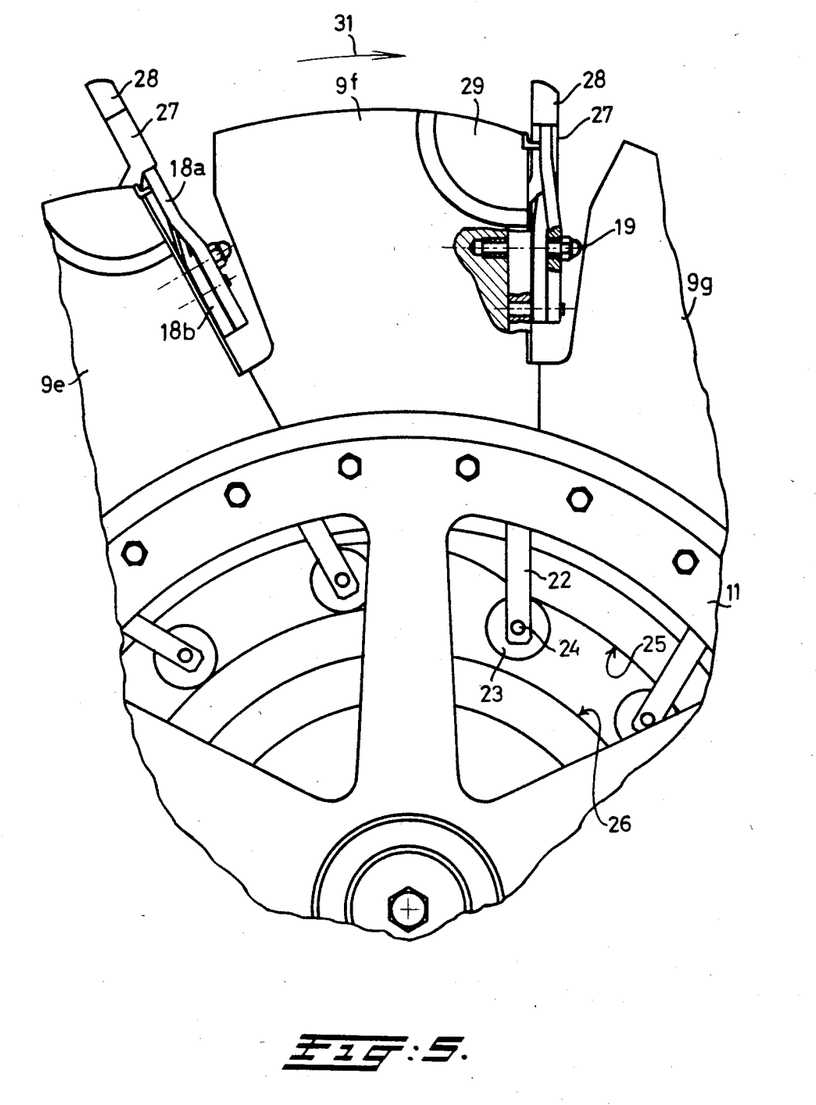
FIG. 5 is a partial view/partial cross-section of the carriers with the means of clamping.
Figure 5A:
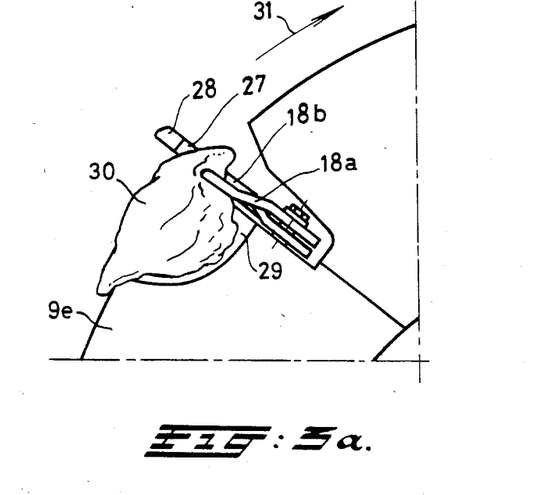
Figure 5B:
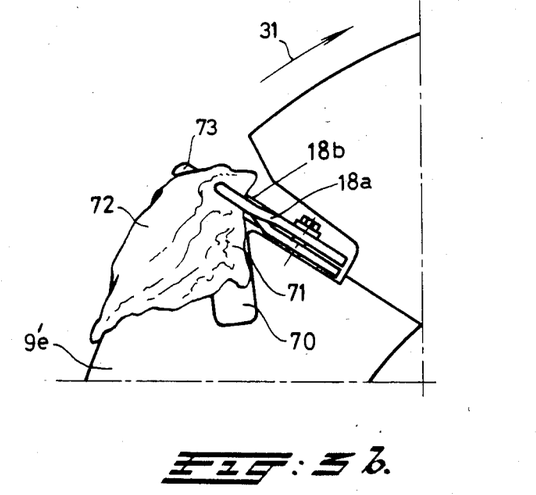
Figure 6:
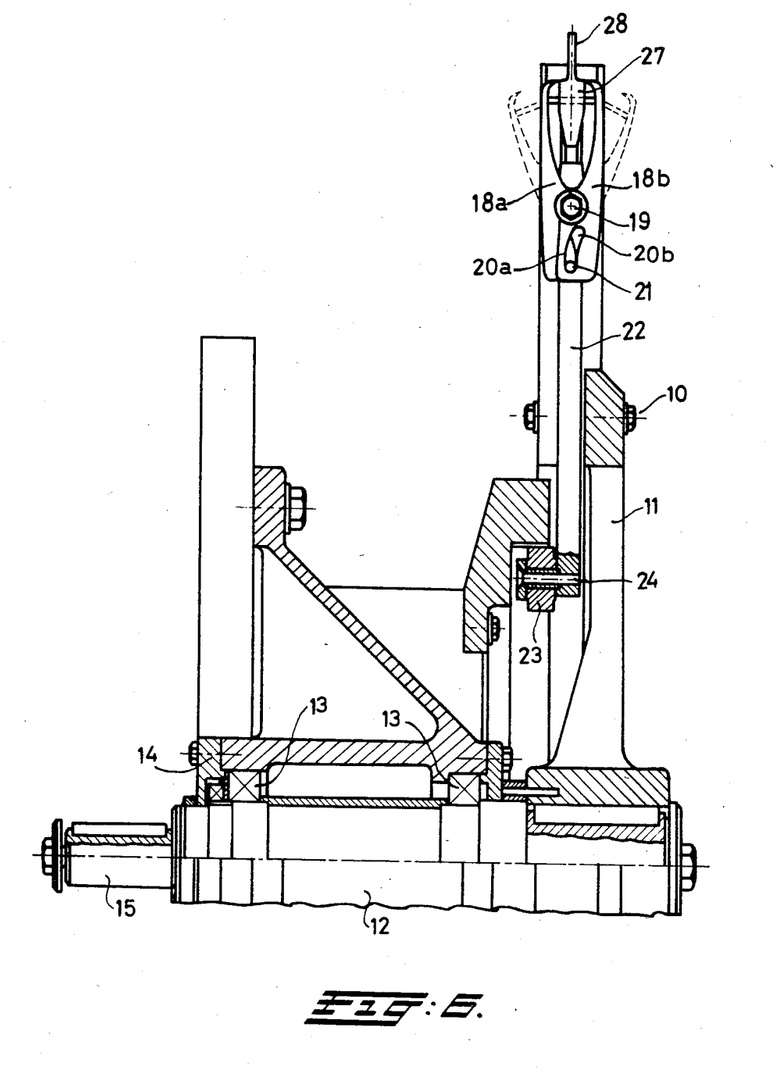
FIG. 6 is also a half view/half cross-section thereof.
Figure 7A:
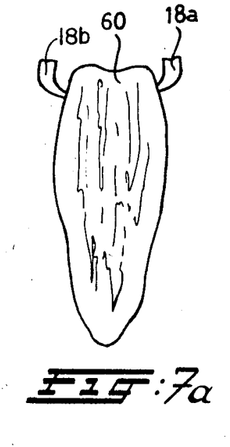
FIGS. 7a to 7e inclusive show a breast which has been processed with a device according to the invention, in the various stages of processing.
Figures 7B, 7C, 7D, 7E:
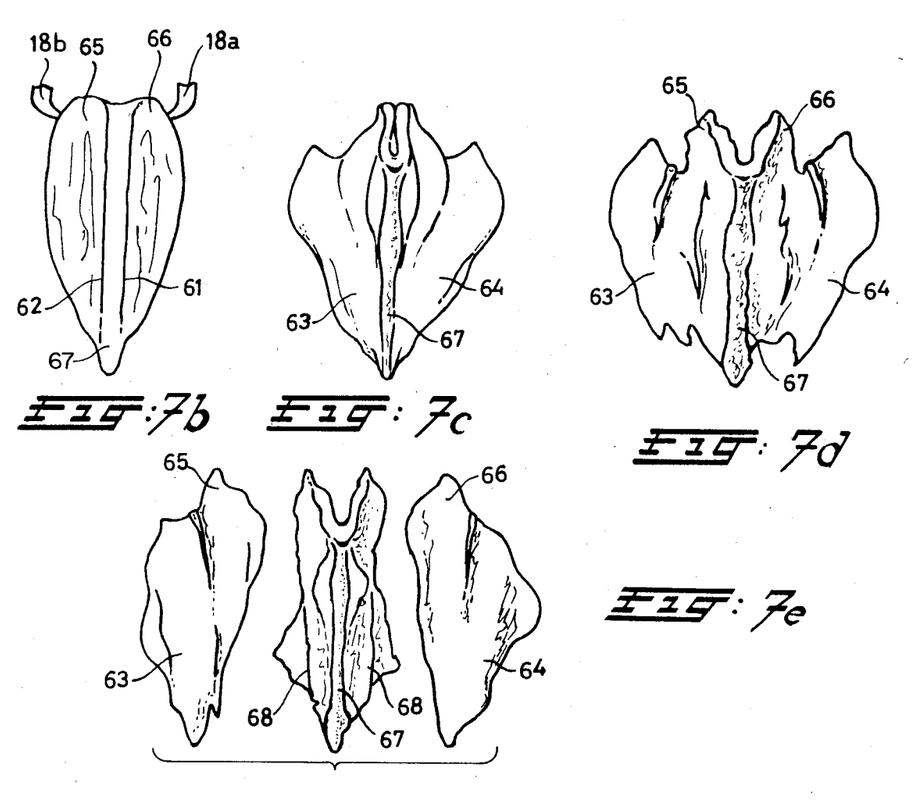

The device depicted comprises twelve flat carriers 9a to 9l inclusive, which are coupled to one another and are attached by bolts 10 to a central carrier wheel 11 which is fixed to the axle 12. The axle 12 is rotatably mounted, by means of the bearings 13, in the fixed frame portion 14; the axle end 15 is driven via a suitable transmission 16, indicated diagrammatically, by the motor 17 (see FIGS. 5 and 6). Each carrier has, at its front edge, a pair of grippers 18a, 18b which can be moved toward and away from one another. They are hinged round the axle 19 and both provided with a guide slot 20a, 20b in the part located below this axle. Into this guide slot fits a guide pin 21 which projects from a control rod 22, the rod carrying, at its other end, a guide roll 23 which can rotate about the pin 24 and co-operates with a pair of guide tracks 25, 26 which are firmly fixed to the frame. This construction has the effect that on rotation of the carriers 9a ... 9l in the frame the respective control rods 22 are moved in a controlled manner inward and outward in the radial direction and thereby the grippers 18a-18b are opened and closed in certain positions of the corresponding carrier.

The control rod 22 continues beyond the guide pin 21 as an upward-projecting part 27 which terminates in a narrowed portion 28 and fulfils a double function: on the one hand as a stop for the breast and on the other hand as a control cam for the second scraper surfaces, to be discussed later.

Adjoining the stop pin 27-28 and the grippers 18a-18b each carrier has a narrowed part 29 into which fits the front part of a breast. FIG. 3a shows how the breast is positioned on the carrier: it is placed with the open front part against the stop pin 27-28, and since the guide tracks 25, 26 are of such shape that the grippers 18a-18b of the carriers, which as viewed in FIG. 1 lie at the left, are open, the breast, when pressed against the pin 27-28, fits between the grippers which are then open. On continued movement of the carrier the grippers close due to the fact that the control rod 22 is pressed towards the wheel centre—the stop 27-28 then also moves radially inward. The breast 30 can be inserted manually but also by means of a suitably constructed feed mechanism.

Figure 2:
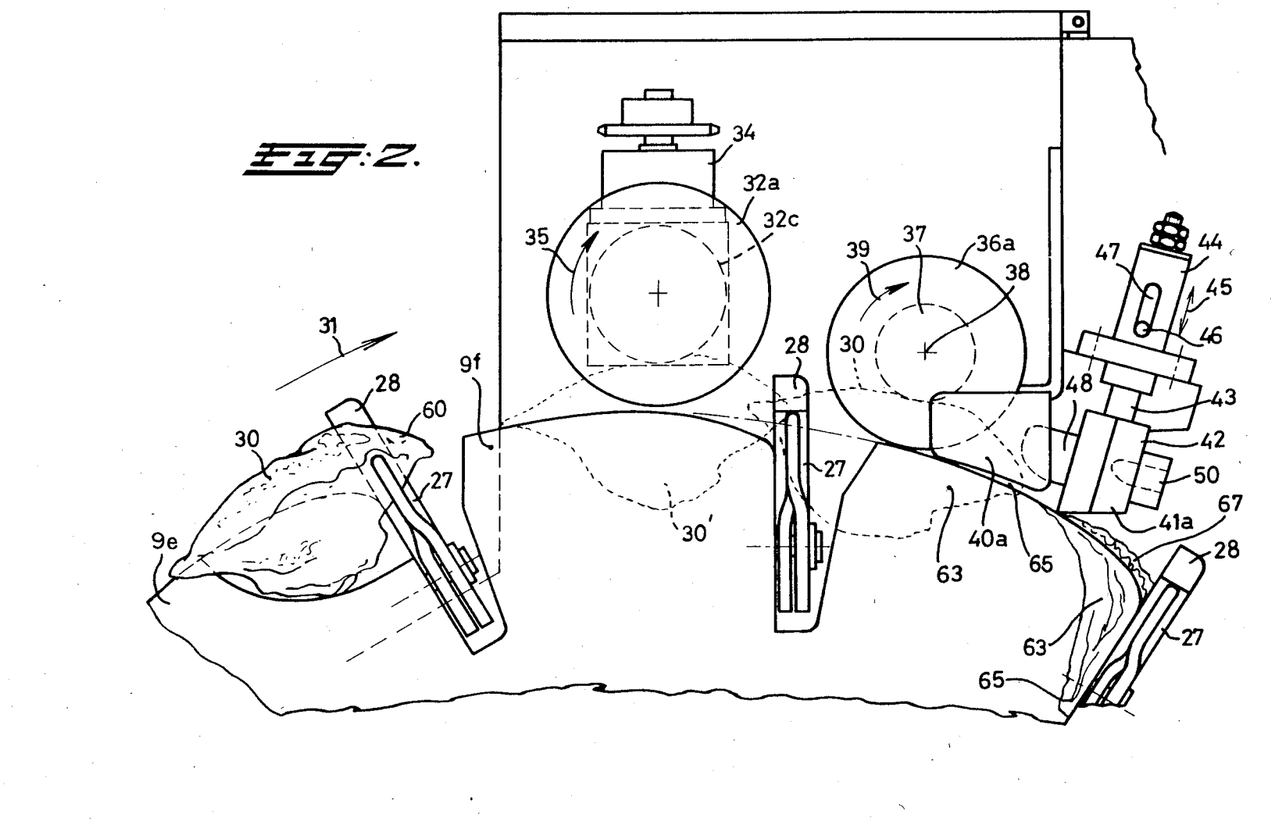
FIG. 2 shows, on a larger scale and in more detail, the most important components of this device.
Figure 4:
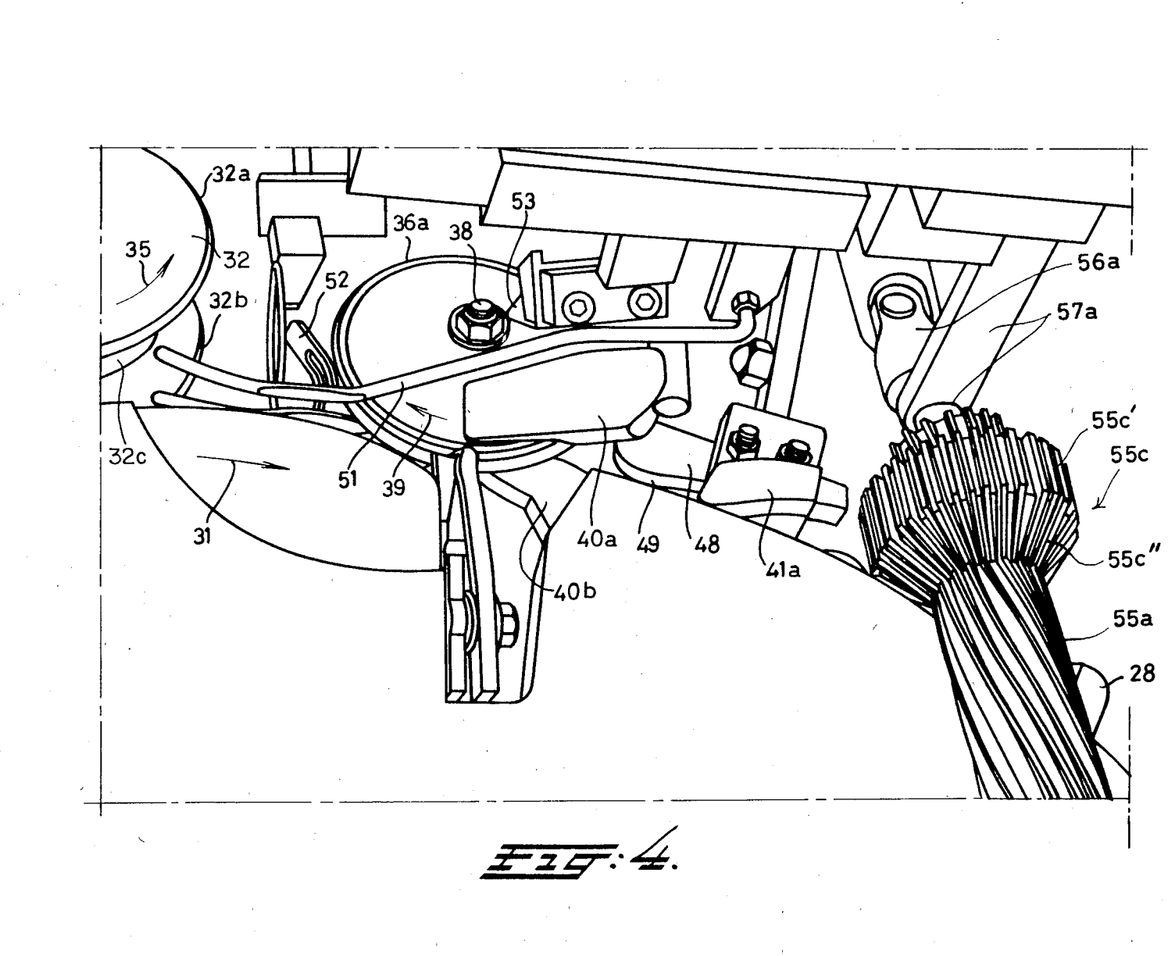
FIG. 4 is a perspective representation of the most important components of the device according to the invention.

The elements by means of which the fillet portions are loosened from the ribs and breastbone are shown in detail in FIGS. 2 and 4, in connection with which it is observed that these figures only show the parts located at one side of the carrier. Viewed in the direction of movement of the carriers—indicated by the arrow 31—they are as follows: a guide roll 32, located above the carriers and having two side flanges 32a, 32b and a recessed part 32c. This roll is driven by the drive unit 34 in the direction of the arrow 35. It is followed by two cutting disk blades 36a, one at each side of the carrier located close to one another (or by a single element with suitable cutting edges), which are rotatingly driven about the axle 38, in the direction of the arrow 39, by means of the drive 37. Next to these cutting disks are located two first scrapers 40a, one at each side of the carrier with curved surfaces diverging in the direction of movement 31, followed by two second smaller scraper surfaces 41a, one at each side of the carrier which consist of the side surfaces of a single block-shape part 42 which is attached to the guide rod 43 and is guided in the casing 44, wherein this rod is acted upon, in the direction of the arrow 45, by a spring not shown in the drawing. The transverse pin 46, connected to the rod 43 and guided in the slot-shaped hole 47, determines the distance over which the block 42 can move.

The block 42 carries a longitudinal stop element 48 in which is formed a longitudinal groove 49 into which fits the stop pin part 28; in this groove there is an exchangeable stop 50. When the pin 28 comes into contact with this stop 50, the scrapers 41a are moved upward against the spring action. The exchangeability of the stops 50 makes it possible to adapt the device to breast pieces of various dimensions.

On each side of the rotating cutting disk blades 36a and above the scrapers 40a, there is attached the rod-shaped guide 51 which carries the protective rod 52 which screens the disk blades; on each side of the disk blades there is moreover located a scraper 53 for keeping the disk blade surfaces clean.

Finally, on each side of the carrier there is located a cylindrical scraper 55a, which is rotatingly driven by a transmission 54 and is provided with circumferential toothing. FIG. 1 shows an embodiment wherein this scraper is located vertically and FIG. 4 an embodiment wherein a cross-coupling 56a, one on each side of the carrier, is included in the drive axle, which makes it possible to set the position of the scraper as desired.

Preferably each scraper 55a, carries at its upper end a toothwheel 55c, respectively, consisting of a cylindrical part 55c', and a conical part 55c''. The cylindrical parts mesh and the teeth on the conical parts clean the upper parts of the carriers.

The operation of the device is further illustrated by reference to FIGS. 7a to 7e inclusive and is as follows:

After placing a breast 30 on a carrier (in FIG. 2, the carrier 9e), the front 60 of the breast is gripped by the grippers 18a, 18b (see FIG. 3a) on continued movement. During the continued movement of the carrier 9e the breast 30 first passes under the pressure and positioning roll 32 having pressure surfaces 32a, 32b and is thereby pressed against the carrier; in FIG. 2, this situation is indicated by 30'. On subsequently passing the cutting disk blades 36a, two lengthwise incisions 61, 62 are made in the back of the breast (see FIG. 7b) and virtually at the same time the scrapers 40a, start to scrape the portions 63, 64 away from the breast (see FIG. 7c). When the front part 60 of the breast reaches the small scrapers 41a, the parts 65 and 66 (see FIG. 7d) are scraped loose. On continued movement of the carrier bearing the breast portions, which now hang down on either side of the carrier while the breastbone with the ribs is on the carrier, the point 28 reaches the stop 50 and presses the scrapers 41a, upwards so that the front edge thereof is forced beyond the breastbone portions 67.

The breastbone 67 and ribs 68, resting on the carrier, with the fillet portion 63, 65 and 64, 66 to the right and left, now reaches the rotating scraper 55a provided with circumferential toothing, which closely and resiliently adjoin the side surfaces of the carrier and sever the fillet portions from the ribs and breastbone. The fillet portions drop down onto the conveyor belt 6 and are removed; the bone portions remain hanging on the carrier until they reach the scrapers 69a, one on each side of the carrier, located on the underside of the device, whereby they are scraped off the carrier; they then drop into the collecting holder 7 and are removed via the line 8, preferably by means of a vacuum suction device.

A device as outlined above, with the carriers described, is suitable for processing so-called "open" breast portions, but the device can also be made suitable for processing so-called "closed" breast portions.

FIG. 3b shows how such breast portions can be processed with a suitable modification of the carriers—of which one is indicated by the reference numeral 9'e. Each front edge of the carriers is provided with a cut-out 70 for receiving the closed portion 71 of the breast 72; the stop pin 73 can in that case not be pushed in and instead is firmly fixed to the carrier. On processing such breasts the operation of the device is in other respects the same as that outlined above.

What is claimed is:

1. Device for removing the pieces of meat from the breast of slaughtered poultry, comprising a plurality of flat carriers movable in a central longitudinal plane, each with a carrying edge and clamping means for the breast and, in succession, in the direction of movement of the carriers, guide means located above the carriers, two cutting elements located one on each side of the central longitudinal plane for making a cut on either side of the breastbone, two first scrapers located one on each side of the said plane and diverging in the direction of movement of the carriers, for loosening the outermost fillet portions from the ribs and breastbone, two smaller second scrapers located one on each side of the said plane and diverging at a smaller angle relative to the said plane, for loosening the frontmost fillet portions and two third scrapers which closely adjoin the two carrier surfaces and are at an angle to the direction of movement of the carriers, for the complete loosening of the two fillet halves from the breastbone.

2. Device according to claim 1, in which each carrier carries a stop pin, projecting from the carrier surface, for the front of the breast, and the second scrapers are located movable away from the carriers against a spring action and are coupled to a projecting stud pointing towards the first scrapers and co-operating with the stop pins of the carriers which can respectively be moved along underneath.

3. Device according to claim 1, in which the guide means is formed by a rotating driven positioning roller.

4. Device according to claim 3, comprising two guide rods located each one outside the cutting elements and diverging in the direction of movement of the carriers.

5. Device according to claim 1, in which the cutting elements are formed by rotating driven disk blades.

6. Device according to claim 1, in which the clamping means are formed by a pair of grippers on the front edge of each carrier, which are movable crosswise relative to the middle longitudinal plane and are located one on each side of the longitudinal plane.

7. Device according to claim 6, in which the two grippers can rotate about a common hinge pin, each gripper being provided with a guide slot, running from the middle to the outer edge, which co-operates with a control pin which projects from a control rod which is located on the carrier and points towards the carrier edge.

8. Device according to claim 7, in which the outward-pointing end of the control rod carries the stop pin.

9. Device according to claim 1, in which a recess which is at an acute angle to the carrier front edge and terminates near the grippers is formed in the carrier.

10. Device according to claim 1, in which the two carrier side walls near the clamping grippers are provided with a recessed part.

11. Device according to claim 1, in which the scrapers adjoining the carrier side surfaces are formed by rotating driven scraper rolls provided with circumferential toothing.

12. Device according to claim 11, in which each scraper roll carries at its upper end a toothwheel consisting of a cylindrical part and a conical part.

13. Device according to claim 1, in which the respective carriers are coupled to one another and conjointly driven, guided in a frame which is provided with guide tracks for the control rod ends.

14. Device according to claim 13, in which the carriers are located in a circular configuration around a common axle of rotation.

* * * * *